United States Patent [19]

Stutelberg et al.

[11] 4,057,931
[45] Nov. 15, 1977

[54] STACKABLE FLOWER POT

[75] Inventors: Kenneth R. Stutelberg, Bloomington; Dennis C. Anderson, Northfield, both of Minn.

[73] Assignee: National Polymers, Inc., Lakeville, Minn.

[21] Appl. No.: 525,580

[22] Filed: Nov. 20, 1974

[51] Int. Cl.² ............................................. A01G 9/02
[52] U.S. Cl. ........................................ 47/66; 47/84; 220/10; 220/23.6; 206/509; 206/519
[58] Field of Search ............... 47/34, 34.13, 19, 34.12, 47/34.11, 66, 84; 220/DIG. 6, 23.6, 380, 69, 10; 215/10; 206/509, 511, 503, 504, 505, 519, 520, 507, 514

[56] References Cited
U.S. PATENT DOCUMENTS

| | | | |
|---|---|---|---|
| 1,020,187 | 3/1912 | Claussen | 47/34 |
| 2,863,259 | 12/1958 | Radford | 47/34.13 |
| 2,905,350 | 9/1959 | Edwards | 206/DIG. 14 |
| 3,326,410 | 6/1967 | Asenbauer | 206/504 |
| 3,686,791 | 8/1972 | Mills | 47/34.12 |
| 3,785,088 | 1/1974 | Guarriello | 47/34 |
| 3,852,912 | 12/1974 | Diller | 47/34.11 |

Primary Examiner—Edward M. Coven
Assistant Examiner—James R. Feyrer
Attorney, Agent, or Firm—Warren A. Sturm

[57] ABSTRACT

A molded stackable flower pot provided with an annular rim adjacent the bottom thereof, which supports the pot so that the bottom surface is spaced upwardly from a surface supporting the pot. The rim has a plurality of apertures defined therein positioned so that the apertures will received peripheral upper edge portions of two other similar flower pots so that pots can be supported in a stacked and interlocked relationship to each other.

8 Claims, 4 Drawing Figures

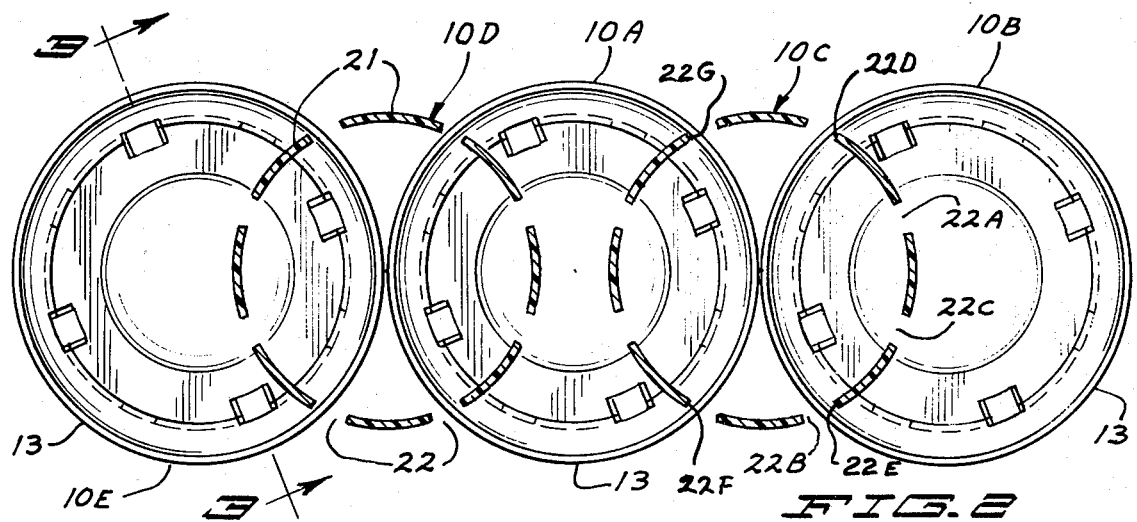
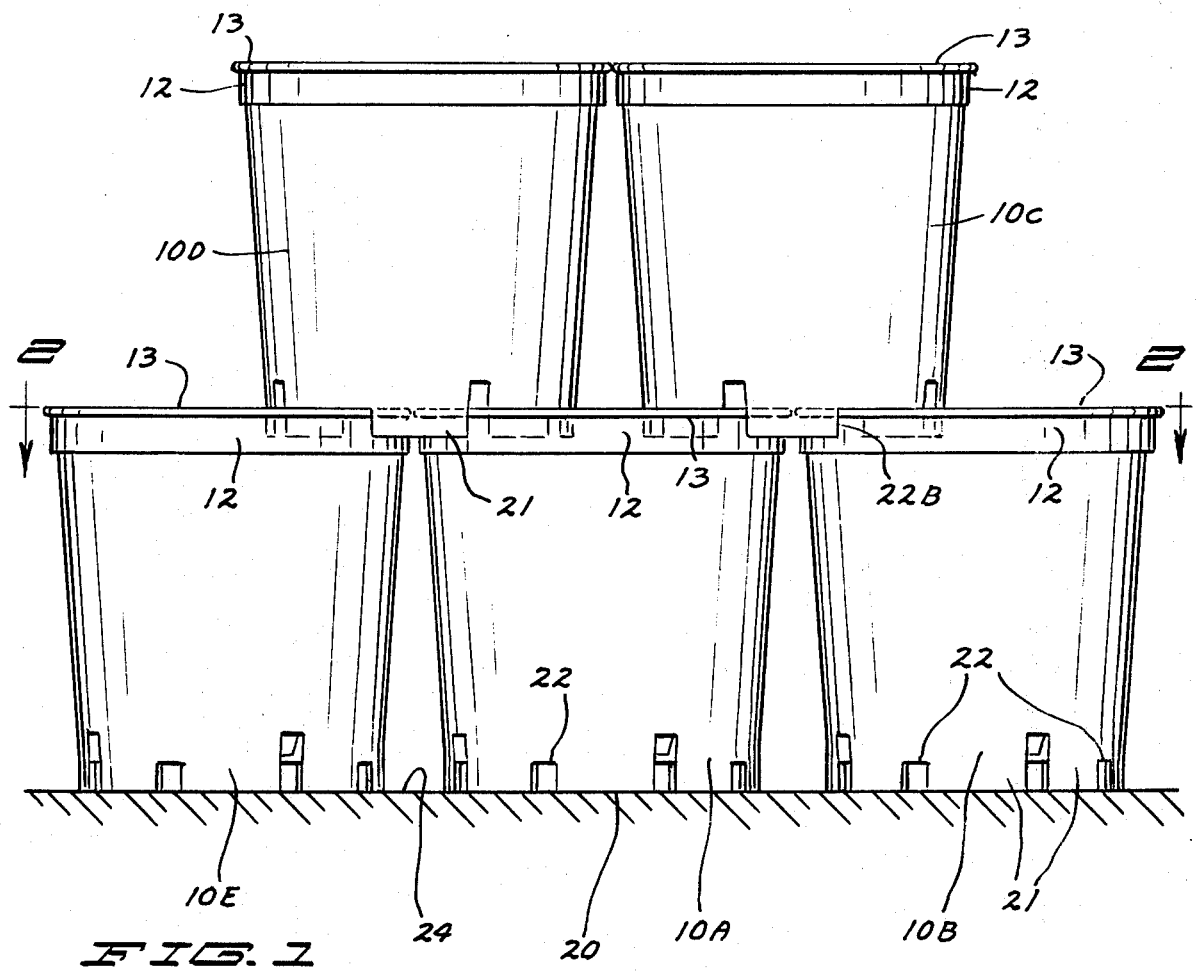

STACKABLE FLOWER POT

BACKGROUND OF THE INVENTION

The present invention relates to stackable flower pots which are easily molded, and which can be securely stacked together (when the pots are full) for shipping or transporting in trucks without requiring crating, boxing or securing straps.

SUMMARY OF THE INVENTION

The present invention relates to a moldable flower pot having means provided thereon to permit stacking a plurality of pots so that the pots can be transported in a stack while filled without danger of shifting or sliding of the upper pots in the stack.

In the form of the invention shown, a molded pot has an annular rim around the bottom edges thereof protruding below the bottom wall of the pot. The rim is provided with a plurality of apertures or recesses of size and position so that portions of the upper edges of two similar pots may be positioned in the receptacles to support one pot on the lower two. The upper pot will not slip off the two lower pots, because the edges of the recesses form stops to prevent sliding. The pots are easily moldable with the recesses defined in the lower rim so that the pots can be low cost, but still may be stacked in a truck when they are filled, without nesting the pots. The upper pots will not shift relative to one another so that the stacking is secure. The rim sections form support feet for the pots to support it on a supporting surface.

BRIEF DESCRIPTION OF THE DRAWINGS

FIG. 1 is a side elevational view of a plurality of pots made according to the present invention shown in a stacked relationship;

FIG. 2 is a sectional view taken along line 2—2 in FIG. 1;

DESCRIPTION OF THE PREFERRED EMBODIMENT

Figure 3:
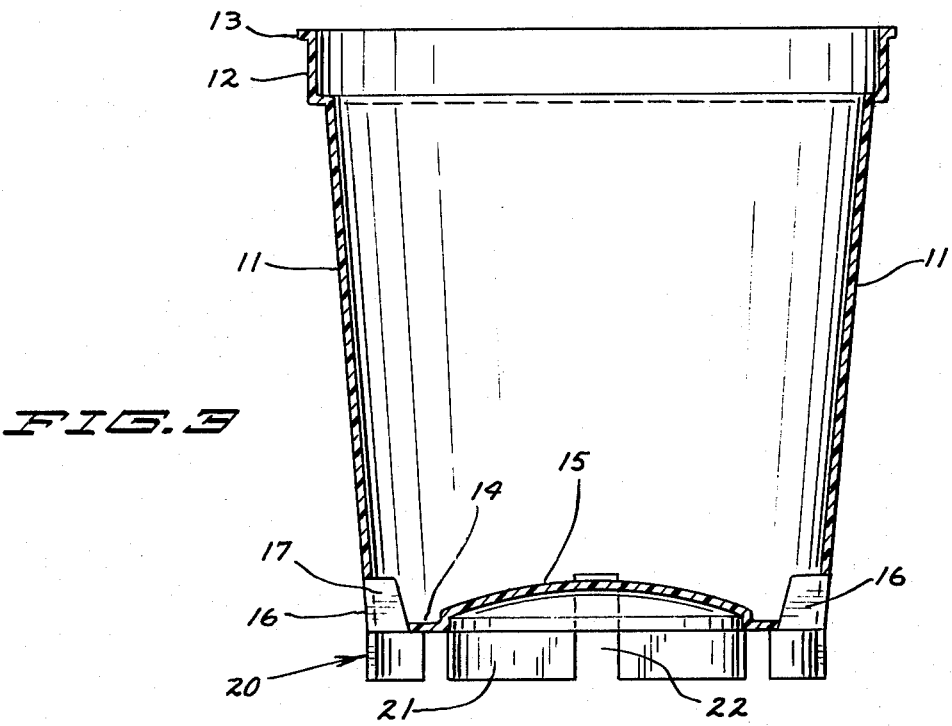
FIG. 3 is a sectional view of an individual pot taken substantially on line 3—3 of FIG. 2.
Figure 4:
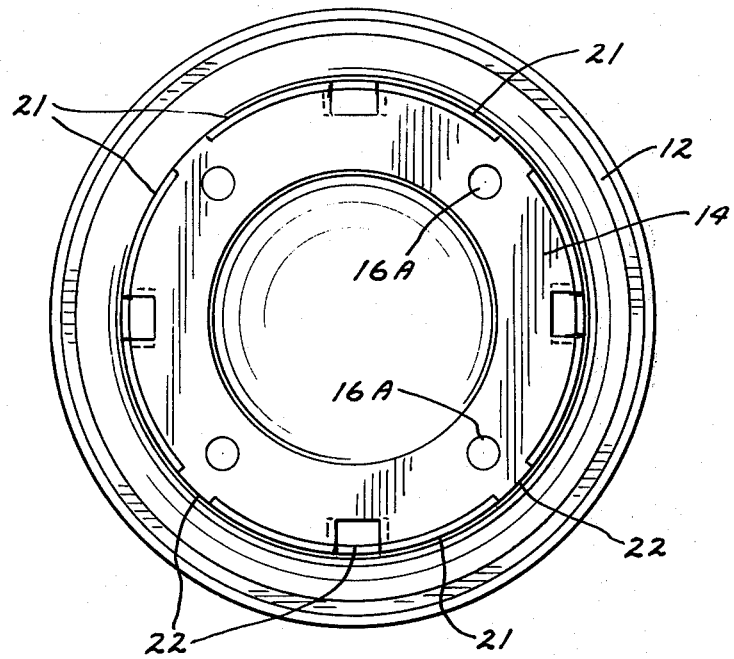
FIG. 4 is a bottom plan view of the flower pot shown in FIG. 3.

The flower pot indicated generally at 10 is, as shown, molded of a suitable plastic material, and includes a truncated, conical shaped outer wall 11, having an upper cylindrical rim portion 12 that is of larger diameter than the immediately adjacent portion of the wall 11, and has a bead 13 around the upper peripheral edge thereof. The wall 11 is integrally molded to a bottom wall 14, which as shown has a raised center portion 15 to provide drainage out toward the outer edges of the bottom wall, so that water can drain out through provided drainage openings 16 and 16A, positioned around the periphery thereof. Gussets 17 are provided adjacent the sides of the openings 16 for reinforcement purposes.

Integral with the wall 11, and extending downwardly from the level of the bottom wall 14, is a support member ring 20 which comprises a number of individual part annular wall sections 21 that are spaced apart by recesses 22. The wall sections 21 can be considered a divided ring around the periphery of the pot, with a plurality of recesses or notches 22 dividing the ring into individual wall sections. Another way of viewing the supporting ring at the bottom is that the wall sections 21 comprise a plurality of support members on the pot, and while as shown the wall sections are of substantial length, and the notches 22 are relatively narrow, there could be more notches than those shown, or less, as long as the wall sections provide the function of supporting the pot independently on a surface, and as will be explained, also provide recesses for receiving and holding upper edge portions of at least two other pots so that one pot is supported by at least two other pots and is held from sliding a substantial amount with respect thereto.

As shown, the recesses 22 between the wall sections or members 21 are such that they will receive the upper rim 12 of two or more adjacent lower pots. For example, the pots 10A and 10B may be placed with the upper rims thereof substantially contiguous and both pots will be operable to support a pot 10C. The recesses of receptacles 22 on the pot 10C will receive the upper portions of the rims on pots 10A and 10B so that 10C cannot slide transversely off pots 10A and 10B, but pot 10C must be lifted upwardly for removal. The same is true for support of a pot 10D on pot 10A and another pot 10E.

As can be seen, the wall sections or members 21 are adequate to support the pots 10A, 10B, and 10E on a surface 24, while the spacings 22 between the support members are arranged so that the upper edge portions of at least two other pots are received by two spaced receptacles at two separated locations on the upper edges of the supporting pots.

It should be noted that while the preferred arrangement for stacking is shown in FIGS. 1 and 2 in that a minimum amount of space is wasted because the upper rims of the lower pots 10A, 10B and 10E are contiguous, the lower pots 10A and 10B may be spaced apart and still support the pot 10C between other of the recesses 22.

The recesses in which the upper edges of the lower pots are placed are defined by support members for supporting the pots, and the members (shown as wall sections 21) prevent substantial sliding of the upper stacked pot with respect to the supporting pots in transverse direction. If the lower pots are spaced, in FIG. 2 for example, the rim or upper edge of pot 20B could alternately be positioned to extend through recesses indicated at 22A and 22B, or could, as a further alternate, be extending through recesses 22A and 22C.

When the pots are stacked as shown, the upper pots will not slide off the lower pots, and a secure stack may be made without nesting the pots inside one another, although as shown the pots may also be nested if empty. This means that the pots can be filled and still be safely stacked for transporting them or for storing them in a desired location without fear that the upper pots will easily slide off the lower pots.

The recesses shown are symmetrically located so that no special rotational orientation of the upper pots is required. The arcuate distance between the retaining edges of the wall sections inside each pot is well over 90 degrees for stability. Also, for security the retaining edges of the wall sections 21, inside each lower pot for example, edges 22D and 22E inside pot 10B and edges 22F and 22G inside pot 10A, are close to the inside surfaces of the respective supporting pots when the supporting pots are substantially tangent as shown in FIG. 2, and the point of tangency is along the central upright axis of the upper pot. Stated another way, preferably at least two separate retaining edges of support members 21 are positioned to be within the area bounded by circles perpendicular to the central axis of pot 10C and of diameter equal to the diameter of the upper edge of the flower pot 10C, when the circles are substantially tangent at a point along the central axis of the pot 10C, by an amount slightly greater than the thickness of the wall defining the upper edge of the pot 10C.

It should be noted that the cylindrical wall upper portion 12 provides a wall section substantially parallel to the edges of the recesses 22. The wall 12 is of slightly greater vertical height than the vertical height of the recesses so the upper beads 12 of the support pots contact the bottom of the upper pot and the lower edges of wall sections 21 do not rest on the shoulder than joins walls 11 and 12.

Those skilled in the art with which our invention is concerned may now also recognize that instead of the interlocking rows shown in FIG. 2, other geometrical patterns may also be employed that utilize the princples of our invention. Consider, for example, triangular or square patterns on a lower layer of pots in which a pot on the top layer may engage and be supported by three or four pots, each having a rim portion in corresponding recesses 22.

Having now therefore fully illustrated and described our invention, what we claim to be new and desire to protect by Letters Patent is:

1. A flower pot having a side wall with a cylindrical upper edge portion defining an interior opening, and a bottom wall, and means fixedly attached to said flower pot and extending downwardly adjacent the periphery of said bottom wall to provide support members extending parallel to the longitudinal axis thereof for supporting said flower pot on a supporting surface, said support members being spaced apart to define recesses between adjacent support members, said recesses being dimensioned and positioned in relationship to the radius and thickness of the upper edge of said flower pot to adapt said flower pot for being supported by the upper edges of at least two other similar flower pots with at least a separate one of the support members of said first mentioned flower pot extending into the interior of each of two other similar flower pots to prevent said first mentioned flower pot from transversely sliding off the tops of other similar flower pots on which the first mentioned flower pot is supported.

2. The combination as specified in claim 1 wherein the upper edge of the flower pot is circular and has a center axis and the recesses being defined by axially extending side edges of the support members, which edges are spaced so that two separate edges lie within the area bounded by a pair of circles of diameter equal to the diameter of the upper edge of said first mentioned flower pot generally tangent at a point along the center axis, said separate edges being within said circles, respectively, by an amount slightly greater than the thickness of the side wall forming the upper edge of said first mentioned flower pot.

3. The combination as specified in claim 1 wherein the support members are formed as wall portions depending from said side wall adjacent the periphery of the bottom wall of the pot, and wherein the recesses between said wall portions are of length substantially less than the length of the wall portions.

4. The combination as specified in claim 2 wherein the wall portions comprise arcuate wall sections, said recesses being defined between adjacent wall sections and extending upwardly to said bottom wall.

5. The combination as specified in claim 4 wherein there are eight wall sections and eight recesses defined between said wall sections, said recesses being one-half the arcuate length of said wall sections.

6. The combination as specified in claim 4 wherein said first mentioned pot has a part conical upright wall, and said wall sections form extensions of said upright wall extending downwardly adjacent said bottom wall.

7. The combination of claim 1 wherein the pot has a cylindrical wall section adjacent upper end thereof, said cylindrical wall section extending for a height at least equal to the height of said support members.

8. The combination of claim 7 and a reinforcing bead formed at the upper edge of said cylindrical wall section.

* * * * *